US012531795B2

(12) United States Patent
Gagliano et al.

(10) Patent No.: US 12,531,795 B2
(45) Date of Patent: Jan. 20, 2026

(54) CONTROLLING OPERATION OF A NETWORK APPLICATION BASED ON NETWORK INFORMATION AND APPLICATION BEHAVIOR

(71) Applicant: Cisco Technology, Inc., San Jose, CA (US)

(72) Inventors: Roque Gagliano, Pully (CH); Marcelo Yannuzzi, Nuvilly (CH); Carlos M. Pignataro, Cary, NC (US); Francisco Sedano Crippa, Vaud (CH)

(73) Assignee: CISCO TECHNOLOGY, INC., San Jose, CA (US)

( * ) Notice: Subject to any disclaimer, the term of this patent is extended or adjusted under 35 U.S.C. 154(b) by 81 days.

(21) Appl. No.: 18/360,099

(22) Filed: Jul. 27, 2023

(65) Prior Publication Data

US 2025/0039068 A1  Jan. 30, 2025

(51) Int. Cl.
*G06F 15/173* (2006.01)
*H04L 43/04* (2022.01)
*H04L 43/12* (2022.01)

(52) U.S. Cl.
CPC .............. *H04L 43/04* (2013.01); *H04L 43/12* (2013.01)

(58) Field of Classification Search
CPC ................................ H04L 43/04; H04L 43/12
USPC ......................................................... 709/224
See application file for complete search history.

(56) References Cited

U.S. PATENT DOCUMENTS

| | | | |
|---|---|---|---|
| 11,375,255 B1 * | 6/2022 | Ramalingam | H04L 41/142 |
| 11,641,319 B2 * | 5/2023 | Richards | H04L 43/14 |
| | | | 709/224 |
| 11,652,691 B1 * | 5/2023 | Ramalingam | H04L 43/0888 |
| | | | 709/221 |
| 2016/0182344 A1 * | 6/2016 | Subhedar | H04L 41/0823 |
| | | | 370/241.1 |
| 2016/0234099 A1 | 8/2016 | Jiao | |
| 2017/0019312 A1 * | 1/2017 | Meyer | G06N 5/025 |
| 2017/0118092 A1 * | 4/2017 | Dixon | H04L 41/0894 |
| 2021/0176114 A1 * | 6/2021 | Hsu | H04L 41/16 |
| 2022/0138081 A1 | 5/2022 | Varma et al. | |
| 2022/0353143 A1 * | 11/2022 | Hill | H04L 41/0813 |
| 2023/0018772 A1 | 1/2023 | Kolar et al. | |
| 2023/0308374 A1 * | 9/2023 | Wang | H04L 45/48 |

OTHER PUBLICATIONS

Cho H., et al., "An Optimal Path Computation Architecture for the Cloud-Network on Software-Defined Networking", Sustainability, May 5, 2015, pp. 5413-5430, doi:10.3390/su7055413, ISSN 2071-1050.

(Continued)

*Primary Examiner* — Alan S Chou
(74) *Attorney, Agent, or Firm* — Edell, Shapiro & Finnan, LLC

(57) ABSTRACT

In one example embodiment, at least one processor determines an impact of an event on a network to a network application based on network data and telemetry information of the network application. The telemetry information of the network application is obtained from the network application placed under conditions corresponding to the event. The at least one processor adjusts operation of the network application based on the impact.

20 Claims, 7 Drawing Sheets

(56) References Cited

OTHER PUBLICATIONS

Cisco: "Cisco Crosswork Optimization Engine Data Sheet", May 5, 2023, 20 Pages.
Cisco: "Cisco WAN Automation Engine (WAE)", retrieved from Internet Jul. 12, 2023, 5 Pages.
Cisco: "Cloud Native Application Observability", Cisco AppDynamics, retrieved from Internet Jul. 12, 2023, 8 Pages.
Cisco: "Segment Routing Configuration Guide for Cisco ASR 9000 Series Routers, IOS XR Release 7.0.x", May 1, 2023, 17 Pages.
Gagliano R., et al., "NETCONF Extension to Support Trace Context Propagation", Jul. 6, 2023, 20 Pages.
Jensen P., et al., "AalWiNes: A Fast and Quantitative What-If Analysis Tool for MPLS Networks", Proceedings of the 16th International Conference on emerging Networking Experiments and Technologies (CoNEXT '20), Dec. 1, 2020-Dec. 4, 2020, No. Barcelona, Spain, pp. 1-8.
OpenTelemetry: "What is OpenTelemetry?", Jun. 30, 2023, 3 Pages.
ThousandEyes: "ThousandEyes Platform", retrieved from Internet Jul. 12, 2023, 12 pages.

\* cited by examiner

CONTROLLING OPERATION OF A NETWORK APPLICATION BASED ON NETWORK INFORMATION AND APPLICATION BEHAVIOR

TECHNICAL FIELD

The present disclosure relates to networking.

BACKGROUND

Path computation is a technique in networking and technologies, such as Resource Reservation Protocol-Traffic Engineering (RSVP-TE), Segment Routing (SR), and Segment Routing version 6 (SRv6). The technique has been used to implement constraint-based algorithms (e.g., low-latency paths, disjoint path, etc.). The calculation for these constraint-based algorithms is typically performed either inside network devices or at a centralized server (e.g., path computation element (PCE) server). These calculations receive as input a topology of the network and network and service states (e.g., latency, bandwidth, jitter, packet loss, etc.).

A standardized mechanism may be used for exporting metrics, such as logs and traces from endpoints to back-end systems. This type of mechanism may be used to export application telemetry data from an on-host or centralized path computation element (PCE). However, path computation elements (PCE) render several decisions without taking into consideration the state of the path computation element applications. This may lead to several adverse consequences. For example, selection of local versus remote path computation is performed without considering the performance of either of these options which may result in network degradation or the selection of less efficient paths. Further, the selection of a centralized path computation element (PCE) server is determined based on simple preference settings (and without considering the performance of the different servers), thereby leading to selection of a lesser performing server. Moreover, the path computation calculations performed by the PCEs do not consider the impact to path computation element applications for a given request, thereby affecting overall network performance.

DETAILED DESCRIPTION

Overview

Figure 1:
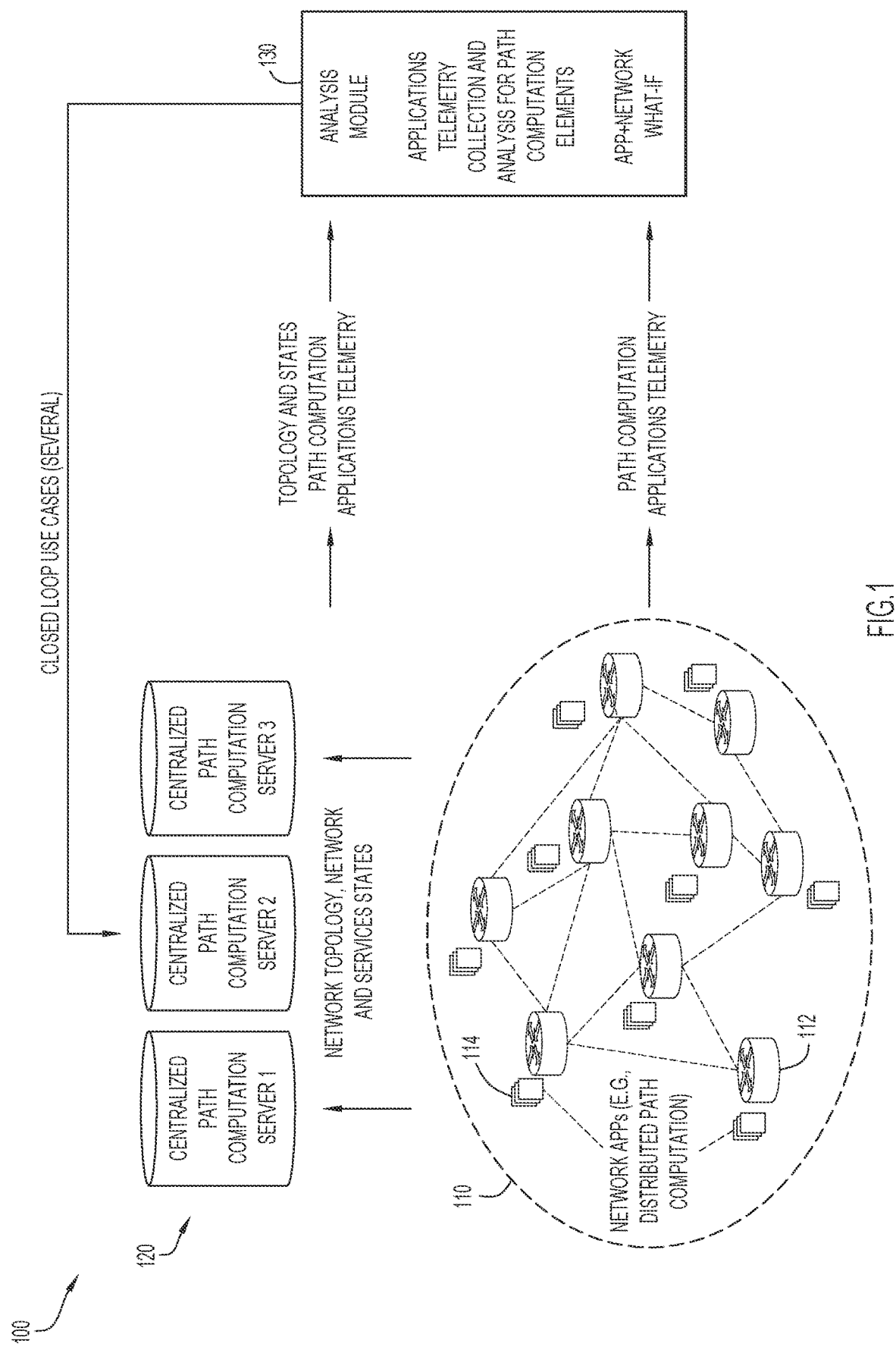
FIG. 1 is a block diagram of an example environment in which network operations may be implemented, according to an example embodiment.

In one example embodiment, at least one processor determines an impact of an event on a network to a network application based on network data and telemetry information of the network application. The telemetry information of the network application is obtained from the network application placed under conditions corresponding to the event. The at least one processor adjusts operation of the network application based on the impact.

EXAMPLE EMBODIMENTS

Path computation elements (PCEs) of a network render several decisions without taking into consideration the state of the path computation element (PCE) applications on the network. This may lead to several adverse consequences. For example, selection of local versus remote path computation is performed without considering the performance of either of these options which may result in selection of less efficient paths. Further, the selection of a centralized path computation element (PCE) server is determined based on simple preference settings (and without considering the performance of different servers), thereby leading to selection of a lesser performing server. Moreover, the path computation calculations performed by the PCEs do not consider the impact to path computation element (PCE) applications for a given request, thereby affecting overall network performance.

An example embodiment combines application telemetry data with network data (e.g., network topology and state information) to provide enhanced control for a network application, such as a path computation application. The example embodiment uses a closed-loop analysis of these diverse sets of data to, among others, dynamically allocate resources, decide a best path computation element (PCE) server for different head-ends, establish or modify PCE server admission control rules, and/or establish or modify network design rules. The example embodiment further predicts results for hypothetical (e.g., "what-if", etc.) scenarios based on application benchmark data.

An example embodiment uses application benchmarking information to modify network applications and control-plane applications, such as a path computation application. Network probes are used to create new network control traffic and more benchmarking scenarios.

An example embodiment evaluates a hypothetical (e.g., "what-if", etc.) network scenario that includes network data or information (e.g., topology, states, etc.) and application performance tracing information using application benchmarking. By way of example, the evaluation is used for a path computation application. However, the evaluation may be used for various other network applications (e.g., routing applications, probing applications, sustainability applications, telemetry streaming applications, etc.). The example embodiment simulates hypothetical (e.g., "what-if", etc.) scenarios by combining network changes and application performance information. The application performance may be augmented by other traffic and/or application characteristics that can be obtained through telemetry, such as application power usage. Different closed-loop implementations for adjusting the path computation application include path computation element (PCE) resource allocation, priorities for selection of a PCE server for head-ends or re-configuration, PCE server admission control, and/or network design or configuration.

As increased quantities of applications are deployed on a network, an example embodiment correlates application behavior and network performance. The example embodiment enriches a path computation model by incorporating application telemetry information, such as application metrics and traces. This additional information is collected from both the network and the path computation element (PCE) infrastructure, and provides several improvements. By way of example, resource allocation may be performed based on hypothetical (e.g., "what-if", etc.) scenarios. The application telemetry information enables resources for path computation to be applied on-demand based on current statics and hypothetical (e.g., "what-if", etc.) scenarios covering network failures.

For example, new scenarios may be considered for network planning to assist in path computation, where the path computation application performance is modified to understand the impact to the network. An example scenario may include an impact on network convergency from an increase of path computation element (PCE) computing delays. This can be evaluated from the use of application telemetry combined with network telemetry.

Further, selection of a centralized path computation element (PCE) server may be based on PCE load. The application visibility and hypothetical (e.g., "what-if", etc.) scenarios enable determination of different head-ends to distribute a request for path computation and may leverage closed-loop performance information (instead of using static preferences). Moreover, path computation elements (PCE) may prevent application-level degradation by using admission control, including an ability to reject path computation requests that may compromise performance. In addition, network design rules may be dynamically adjusted based on the application visibility and hypothetical (e.g., "what-if", etc.) scenarios.

While the present embodiments are described with respect to path computation (or path computation elements (PCEs) and/or a path computation application), it will be appreciated that the present embodiments may be applied to various other network related operations, processes, or applications (e.g., routing processes or applications, probing processes or applications, collection processes or applications, sustainability processes or applications, telemetry processes or applications, etc.) to control those processes based on an impact to applications, a network, and/or hypothetical scenarios in substantially the same manner described below.

FIG. 1 illustrates a block diagram of an example environment 100 in which an embodiment presented herein may be implemented. By way of example, environment 100 is described with respect to path computation (or path computation elements (PCEs) and/or a path computation application). However, it will be appreciated that the environment may be used for various other network related operations, processes, or applications (e.g., routing processes or applications, probing processes or applications, collection processes or applications, sustainability processes or applications, telemetry processes or applications, etc.) in substantially the same manner described below.

Environment 100 includes a network 110 with one or more network nodes 112, one or more path computation element (PCE) servers 120, and an analysis module 130.

Path computation determines routing paths through the environment, and employs a path computation application for this determination. The path computation is determined by path computation elements (PCEs) that execute the path computation application, and may include PCE servers 120 and/or network nodes 112. By way of example, the path computation application includes centralized PCE applications on PCE servers 120 and distributed PCE applications 114 on network nodes 112. In the example embodiment, the path computation may utilize network information and information for the centralized and distributed PCE applications to control the path computation. However, the path computation and other applications for use with present embodiments may include any types of applications (e.g., centralized or on-premise or on-host, distributed, hybrid including centralized and distributed applications, etc.).

Path computation element (PCE) servers 120 are preferably centralized, and may be coupled to, or included within, network 110. The PCE servers (and PCE centralized applications) perform the path computation in combination with network nodes 112 (and distributed PCE applications 114) for routing within environment 100. Network nodes 112 provide network information (e.g., network topology information, network state information, network service information, etc.) to PCE servers 120 for use in determining paths.

Analysis module 130 may be disposed within a path computation element (PCE) server 120 and/or network node 112, or may be (or disposed within) a computing device coupled to, or included within, a PCE server and/or network node. Analysis module 130 receives network topology and state information (e.g., bandwidth, central processing unit (CPU), memory, etc.), and centralized PCE application information (e.g., metrics and traces) from PCE servers 120. In addition, analysis module 130 receives PCE distributed application information (e.g., metrics and traces) from network nodes 112. The network nodes may stream performance or other information pertaining to the distributed PCE applications. Analysis module 130 analyzes the network and centralized and distributed PCE application information, and uses analysis results to control the path computation application for determining paths. This may form a closed loop for determining the paths. The analysis module may predict impacts to the path computation application and/or network based on hypothetical (e.g., "what-if", etc.) scenarios using the network and centralized and distributed PCE application information. The analysis may be used for capacity planning and/or for real-time configuration of the network and/or the path computation application.

Figure 2:
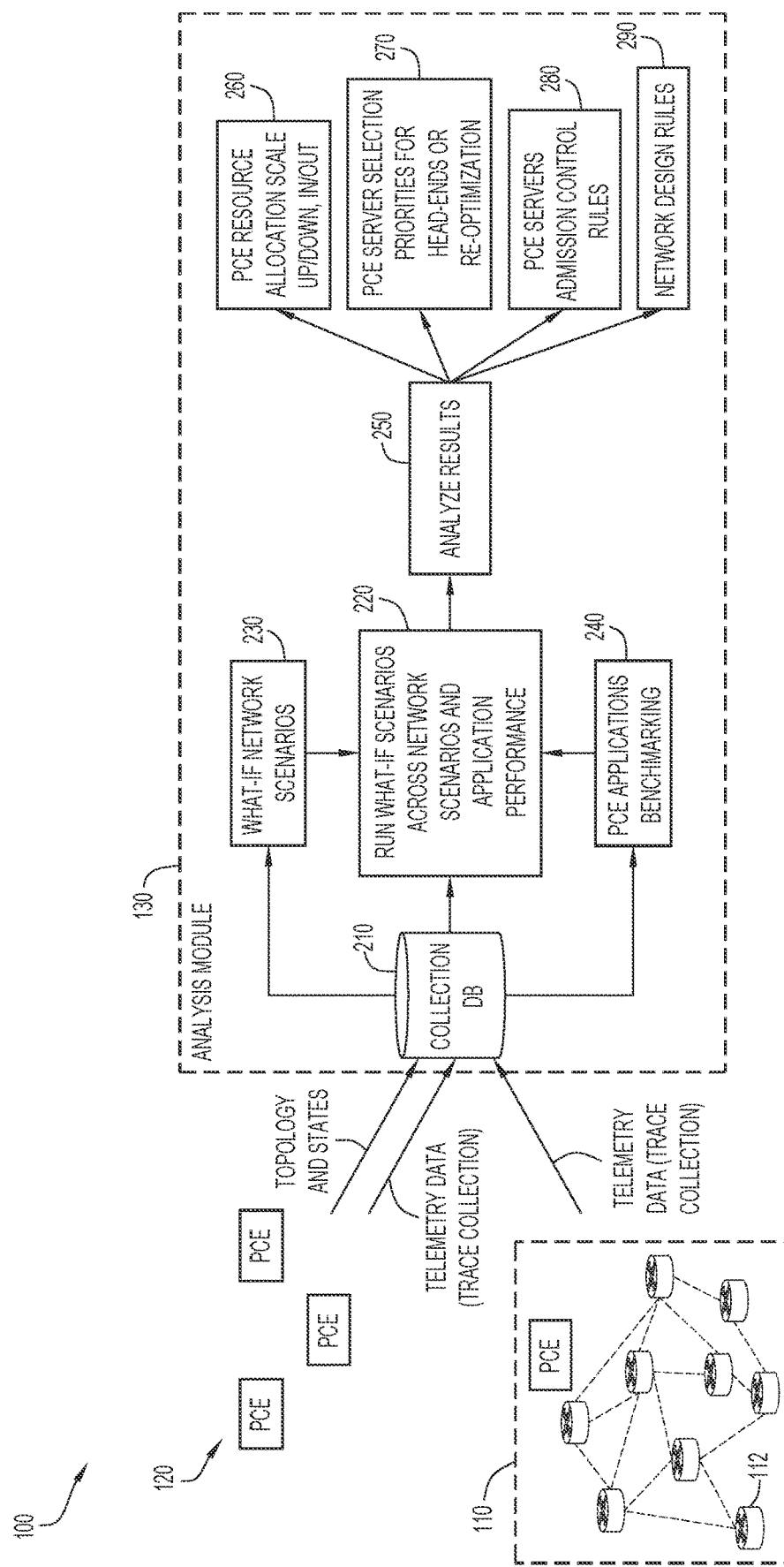
FIG. 2 is a block diagram of the environment of FIG. 1 with further details of performing network operations, according to an example embodiment.

Referring to FIG. 2, analysis module 130 includes a database 210 that stores network topology and state information (e.g., bandwidth, central processing unit (CPU), memory, etc.) and centralized and distributed path computation element (PCE) application information (e.g., metrics and traces) received from PCE servers 120 and network nodes 112. Thus, telemetry collection may combine information from the network topology and state with application telemetry data (e.g., centralized and distributed PCE applications).

Analysis module 130 may benchmark the centralized and distributed path computation element (PCE) applications at operation 240, thereby creating baselines for normal application operations and for an impact of different hypothetical (e.g., "what-if", etc.) scenarios. This may be accomplished due to collection of the application telemetry data for the centralized and distributed PCE applications. Periodic events may include the use of probes to measure behavior of the PCE infrastructure (e.g., PCE servers 120, network nodes 112, and the centralized and distributed PCE applications) under stress. The benchmark includes various metrics that may be measured for scenarios (e.g., resources used/stressed, disabling each individual link of the network environment, node failures (e.g., failure of multiple links, etc.), path computation application behavior (e.g., response time, throughput, requests handled, etc.), etc.).

Analysis module 130 uses information from the network states, centralized and distributed PCE application performance and benchmarks, and/or the probe responses to simulate or execute hypothetical (e.g., "what-if", etc.) scenarios (across network circumstances and application performance) at operation 220. Common hypothetical (e.g., "what-if", etc.) network scenarios (e.g., link/node failures in the network environment, etc.) may be maintained in a scenario library 230. By way of example, the hypothetical ("what-if") scenarios may include single link failures of all network links in the environment.

Analysis module 130 analyzes results of the simulated hypothetical scenarios at operation 250. The hypothetical (e.g., "what-if", etc.) scenarios may be simulated for periodic events or a given network event, and various outcomes and closed loops may be perceived. The simulated hypothetical (e.g., "what-if", etc.) scenarios are used to predict future performance or outcomes for a given scenario which are used to adjust the path computation. This may be used for capacity planning and/or real-time configuration of the network and/or path computation application (e.g., centralized and/or distributed path computation element (PCE) applications) for more precise path computation. The hypothetical (e.g., "what-if", etc.) scenarios may be from the perspective of the network environment or the path computation application. For example, a hypothetical (e.g., "what-if", etc.) scenario may correspond to a network event (e.g., failure of a link, etc.) to predict an impact to the path computation application. Alternatively, a hypothetical scenario (e.g., "what-if", etc.) may correspond to a path computation application event (e.g., slow response for a centralized or distributed path computation element (PCE) application, etc.) to predict an impact to the network (e.g., slow convergence (or time for routers to obtain information providing a same view of network topology), etc.).

The hypothetical (e.g., "what-if", etc.) scenarios are different from typical network simulations that examine an impact on network devices. In contrast, analysis module 130 determines network changes and also an impact on the performance of the path computation application (e.g., centralized and distributed path computation element (PCE) applications, etc.). This impact on path computation application performance may be ascertained from past experiences and/or by using probes that stress the PCE infrastructure (e.g., PCE servers 120, network nodes 112, and the centralized and distributed PCE applications), and assist the system in creating baselines for PCE infrastructure behavior under stress.

A resulting determination from a hypothetical (e.g., "what-if", etc.) scenario indicates whether or not the path computation element (PCE) infrastructure (e.g., PCE servers 120, nodes 112, and the centralized and distributed PCE applications) could support theoretical network events without affecting customer experience and assigned thresholds (e.g., service level agreement (SLA), etc.). The results from simulation of the hypothetical (e.g., "what-if", etc.) scenario (e.g., impact to the path computation application, etc.) may provide possible variations from a current state that may be sent as feedback to network 110 and/or PCE servers 120.

By way of example, a resource decision may be rendered based on simulation results at operation 260 (e.g., more or less resources may be allocated to the path computation application, etc.). The application telemetry information enables resources for path computation to be applied on-demand based on current statics and the hypothetical (e.g., "what-if", etc.) scenarios covering network failures. For example, path computation applications take longer and affect network performance during topology changes (e.g., interface down/node down). These failures are simulated to calculate the path computation application performance. Resource allocations may be performed for the path computation application (e.g., resource allocations for containers, virtual machine (VM), central processing unit (CPU), memory, etc. for the centralized and/or distributed path computation element (PCE) applications). The resource allocations may scale resources up or down, and may also scale resources in or out (e.g., adding or removing resource instances, etc.) based on the simulation results (e.g., decreased or increased path computation application performance, etc.). For example, resources may be scaled up or in for decreased path computation application performance, and may be scaled down or out for increased path computation application performance.

Priorities for selection of a path computation element (PCE) server 120 may be determined at operation 270 based on the simulation results (e.g., the priorities adjust selection to avoid selecting a busy PCE server, etc.). The application visibility and hypothetical (e.g., "what-if", etc.) scenarios enable determination of different head-ends to distribute a request for path computation, and may leverage closed-loop performance information (instead of using static preferences).

New admission control rules may be set (or existing rules modified) for path computation element (PCE) servers 120 and/or network nodes 112 at operation 280 based on the simulation results. In this case, the path computation element (PCE) servers and/or network nodes may prevent application-level degradation by using admission control, including an ability to reject path computation requests that may compromise performance.

In addition, network design rules may be dynamically adjusted based on simulation results at operation 290. The network design rules may indicate network configurations (e.g., sessions per path computation element (PCE) server and/or node, link state packets (LSP) per link, etc.). These rules or configurations are typically static. However, a present embodiment may dynamically alter these rules based on the application visibility and hypothetical (e.g., "what-if", etc.) scenarios.

When the decisions are sent to network 110 and path computation element (PCE) servers 120, the collection infrastructure continues monitoring the network and path computation application and creating new baselines. The network and PCE server adjust the path computation based on the decisions (e.g., adjust resources, adjust selection of the PCE server, adjust admission control rules, adjust network design rules, etc.).

Figure 3:
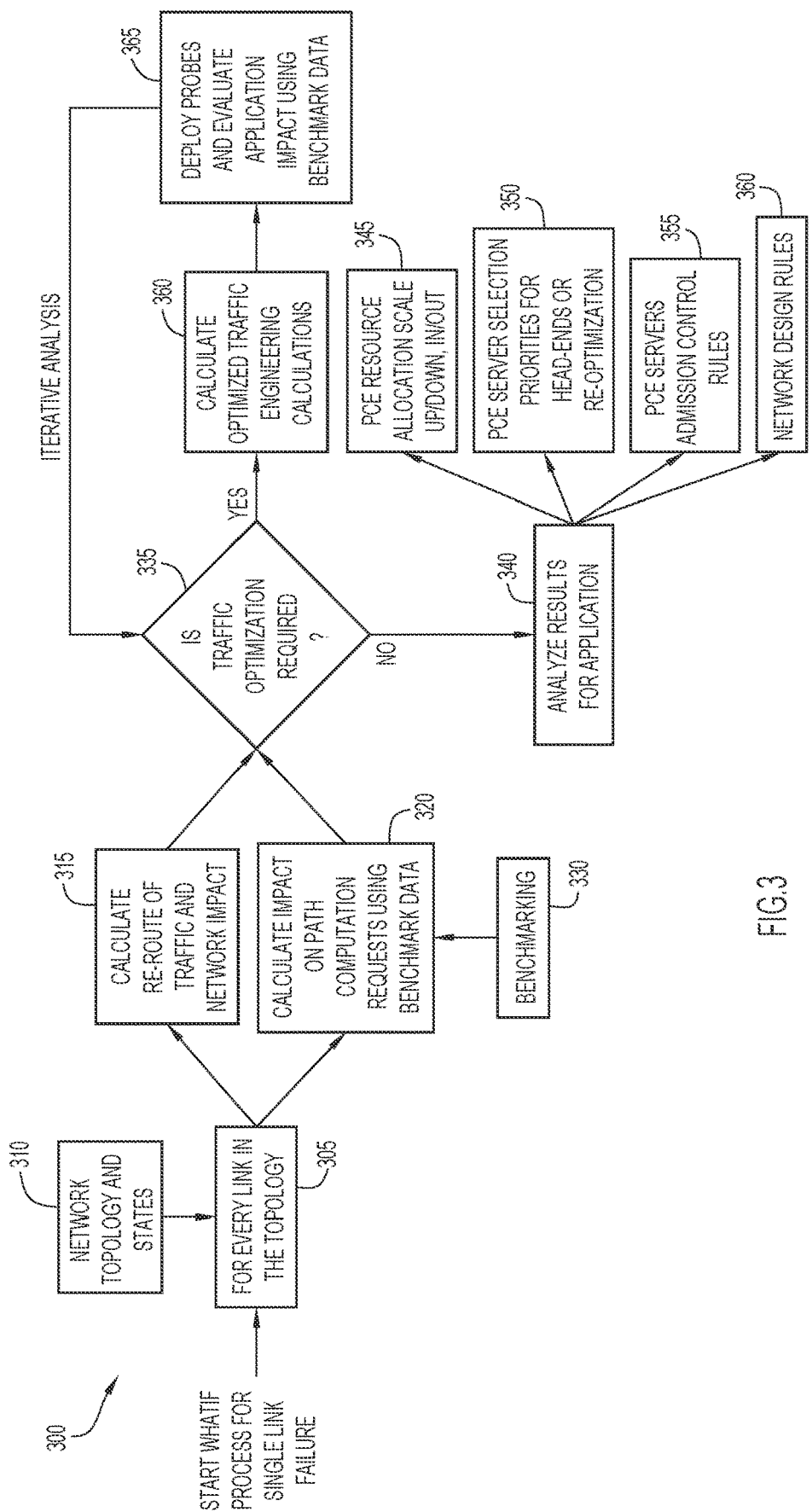
FIG. 3 is a flowchart of a method for predicting application performance for a hypothetical network scenario and determining corresponding adjustments, according to an example embodiment.
Figure 4:
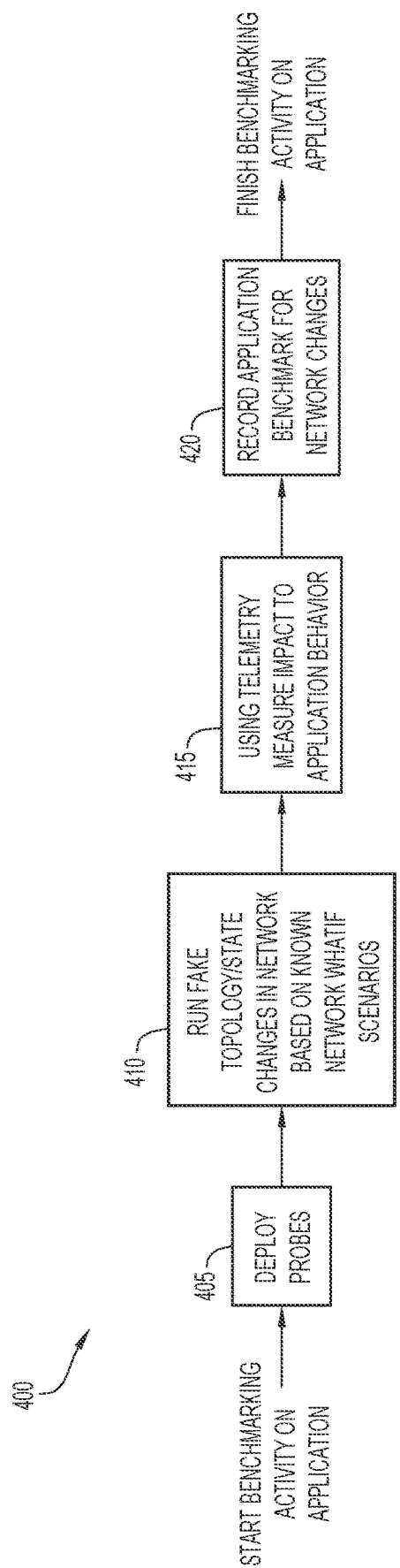
FIG. 4 is a flowchart of a method for determining a benchmark for an application on a network, according to an example embodiment.
Figure 5:
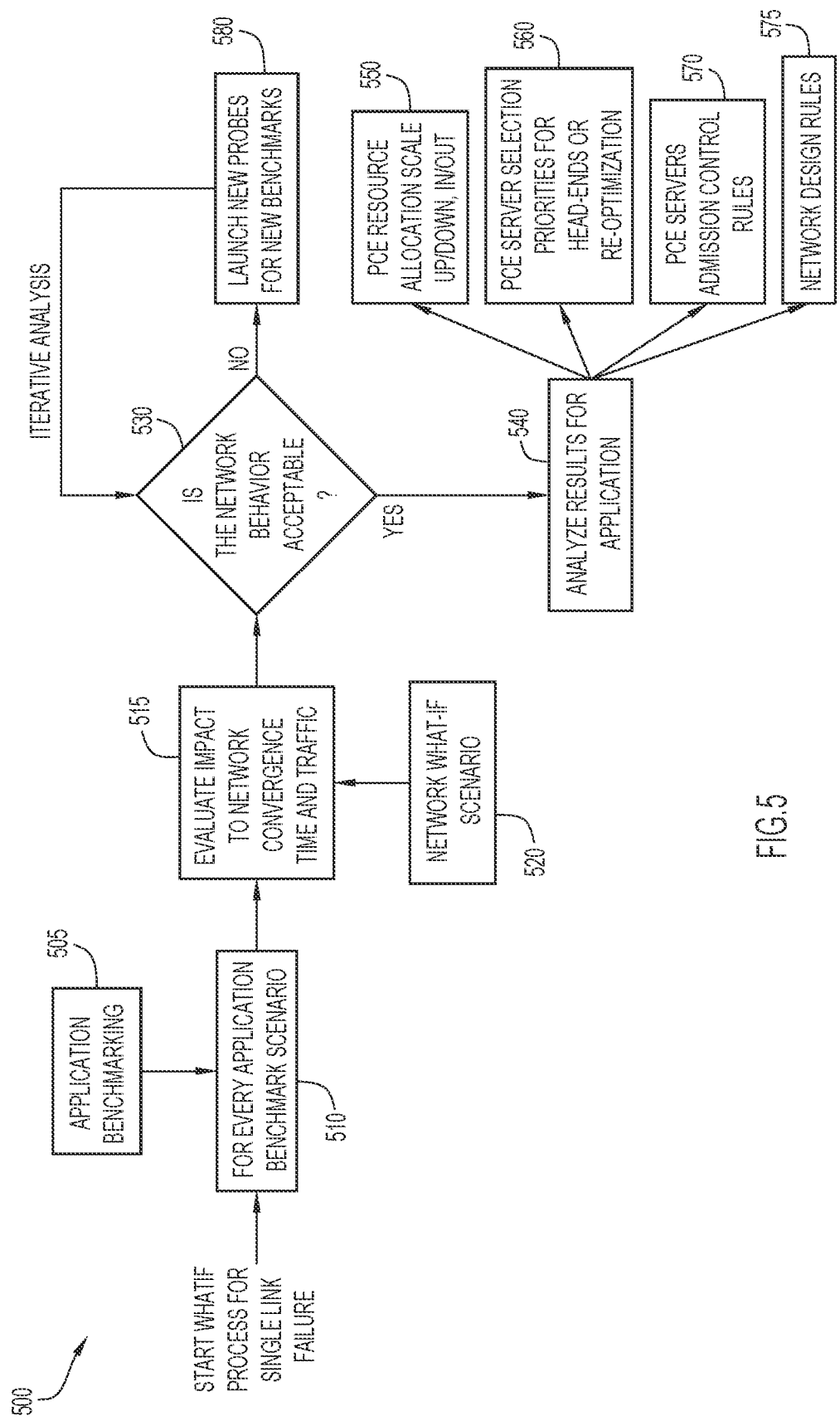
FIG. 5 is a flowchart of a method for predicting network performance for a hypothetical application scenario and determining corresponding adjustments, according to an example embodiment.

With continued reference to FIGS. 1 and 2, FIG. 3 illustrates a flowchart of a method 300 for predicting application performance for a hypothetical network scenario and determining corresponding adjustments for determining a routing path based on network information and application performance information according to an example embodiment. By way of example, method 300 pertains to an example embodiment for a single link failure scenario. In this case, each link of the network topology is examined and evaluated for the impact on the network topology of a link failure and the consequent impact of this failure on the path computation application (e.g., centralized and distributed path computation element (PCE) applications). A closed loop exists for configuring traffic engineering measures, which also include the path computation application impact. However, other network hypothetical (e.g., "what-if", etc.) scenarios (or use cases) may be used, such as single node failure, single site failure, and others. In other words, this analysis analyzes an impact to the path computation application based on performance of the network.

Initially, a network link is selected at operation 305, and corresponding network topology and state information 310 is obtained (e.g., bandwidth, central processing unit (CPU), memory, etc.). The information is used to determine alternative routes for network traffic and network impact at operation 315. This may be performed based on any conventional or other routing algorithms and metrics. The network information and benchmark information 330 (for the centralized and distributed path computation element (PCE) applications) are used to determine an impact on path computation requests from the disabled link at operation 320. This may be performed based on any conventional or other application metrics.

For example, the centralized and distributed path computation element (PCE) applications may be benchmarked (e.g., collecting application telemetry data for the centralized and distributed PCE applications), thereby creating baselines for normal application operations and for an impact of different hypothetical (e.g., "what-if", etc.) scenarios in substantially the same manner described herein. The benchmarks include various metrics that may be measured for the scenarios (e.g., resources used/stressed, disabling each individual link of the network environment, node failures (e.g., failure of multiple links, etc.), path computation application behavior (e.g., response time, throughput, requests handled, etc.), etc.). The benchmark for normal operations is compared to the benchmark for the operations with the disabled link to determine an impact to the path computation requests (e.g., changes in network and/or path computation application metrics between the normal benchmark and link failure benchmark).

The alternative routes and impact on the path computation requests are analyzed at operation 335 to determine whether or not traffic configuration is to be performed. This may be performed by comparing attributes or metrics of network traffic and the path computation requests to corresponding thresholds (e.g., packet loss, data quantity, latency, application metrics, etc.). When traffic configuration is to be performed, traffic engineering calculations are performed at operation 335. The calculations may be any conventional or other network traffic calculations or metrics. Once the traffic is configured according to the calculations (e.g., network adjustments based on the calculations, etc.), probes are deployed to benchmark the path computation application and evaluate an impact of the calculated traffic to the path computation application using this benchmarked data at operation 365. The process may be repeated from operation 335 in an iterative fashion until traffic configuration is no longer needed.

When traffic configuration is not to be performed as determined at operation 335, results for the path computation application based on the failure of the selected link are analyzed at operation 340. The results from simulation of the hypothetical (e.g., "what-if", etc.) scenario (e.g., impact to the path computation application, etc.) may provide possible variations from a current state that may be sent as feedback to network 110 and/or path computation element (PCE) server 120 in substantially the same manner described above.

By way of example, a resource decision may be rendered based on simulation results at operation 345 (e.g., more or less resources may be allocated to the path computation application, etc.) in substantially the same manner described above. Resource allocations may be performed for the path computation application (e.g., resource allocations for containers, virtual machine (VM), central processing unit (CPU), memory, etc. for the centralized and distributed path computation element (PCE) applications). The resource allocations may scale resources up or down, and may also scale resources in or out (e.g., adding or removing resource instances, etc.) based on simulation results (e.g., decrease or increase in path computation application performance, etc.).

Priorities for selection of a path computation element (PCE) server 120 may be determined at operation 350 based on the simulation results (e.g., priorities adjust selection to avoid selecting a busy PCE server, etc.) in substantially the same manner described above. The application visibility and hypothetical (e.g., "what-if", etc.) scenarios enable determination of different head-ends to distribute a request for path computation, and may leverage closed-loop performance information (instead of using static preferences).

New admission control rules may be set (or existing rules modified) for path computation element (PCE) servers 120 and/or network nodes 112 at operation 355 in substantially the same manner described above. In this case, PCE servers 120 and/or network nodes 112 may prevent application-level degradation by using admission control, including an ability to reject path computation requests that may compromise performance.

In addition, network design rules may be dynamically adjusted based on simulation results at operation 360 in substantially the same manner described above. The network design rules may indicate network configurations (e.g., sessions per path computation element (PCE) server and/or node, link state packets (LSP) per link, etc.).

The process is repeated for each link in the network to determine an impact of failure of that link on network topology and the path computation application. This information may be fed back to network 110 and/or path computation element (PCE) server 120 to adjust the path computation (e.g., adjust resources, adjust selection of a PCE server, adjust admission control rules, adjust network design rules, etc.).

With continued reference to FIGS. 1-3, FIG. 4 illustrates a flowchart of a method 400 for determining a benchmark for an application on a network according to an example embodiment. Initially, probes are deployed to benchmark behavior of the path computation application under certain known network conditions or events (e.g., link failures as described above for FIG. 3). The use of telemetry information from the path computation application is used to create these benchmarks. The benchmarks include various metrics that may be measured by the probes for the scenarios (e.g., resources used/stressed, disabling each individual link of the network environment, node failures (e.g., failure of multiple links, etc.), path computation application behavior (e.g., response time, throughput, requests handled, etc.), etc.).

The probes are deployed at operation 405, and network topology state changes are implemented according to the hypothetical (e.g., "what-if", etc.) scenarios at operation 410. For example, certain network links, nodes, and/or sites may be disabled according to the hypothetical (e.g., "what-if", etc.) scenarios. In other words, the path computation application is placed under conditions of the hypothetical (e.g., "what-if", etc.) network events or scenarios to determine the benchmark. The probes may be any software and/or hardware modules, may reside on or be coupled to network devices, and may measure network and application performance.

Telemetry information is used to measure an impact to path computation application behavior at operation 415 (e.g., various application metrics may be measured, such as response time, throughput, requests handled, etc. for the centralized and distributed path computation element (PCE) applications). The resulting measurements (or metrics) are recorded at operation 420 and serve as a benchmark for the path computation application (e.g., or individual centralized and distributed path computation element (PCE) applications) with respect to the network changes. For example, a benchmark for normal operations for the path computation application (or of the individual centralized and distributed path computation element (PCE) applications) may be compared to a benchmark for hypothetical (e.g., what-if", etc.) scenarios to determine an impact to the path computation application (e.g., changes in network and/or path computation application (or individual PCE application) metrics between the normal benchmark and the link failure benchmark). By way of example, a network scenario may produce an increase in a response time metric for the path computation application (or one or more individual PCE applications), thereby indicating the network scenario slows response time of the path computation application (or the individual PCE applications).

With continued reference to FIGS. 1-4, FIG. 5 illustrates a method 500 for predicting network performance for a hypothetical application scenario and determining corresponding adjustments according to an example embodiment. An additional set of hypothetical (e.g., "what-if", etc.) scenarios (or use cases) may be utilized for evaluating path computation application performance (e.g., determining an impact of slow path computation application performance on network behavior under link failure situations, etc.). The stressed analysis may be implemented by deploying probes. The additional set of hypothetical (e.g., "what-if", etc.) scenarios may be used to determine how a change in path computation application performance affects the network behavior (e.g., convergence (or time for routers to obtain information providing a same view of network topology), etc.) when under stress, and/or the benefits to the network behavior from adding more resources for the path computation application. In other words, this analysis analyzes an impact to the network based on performance of the path computation application.

By way of example, method 500 shows an additional set of hypothetical (e.g., "what-if", etc.) scenarios (or use cases). Initially, different application events or scenarios (e.g., quantities of requests, increase/decreased resources, etc.) are benchmarked for the path computation application (or individual centralized and/or distributed path computation element (PCE) applications) at operation 505. This may be accomplished using probes in substantially the same manner described above. A benchmarked scenario for the path computation application is selected at operation 510, and an impact to the network (e.g., network convergence time and traffic) is determined at operation 515 based on a hypothetical (e.g., "what-if", etc.) network scenario 520 (e.g., single link failure, etc.).

The network behavior is analyzed at operation 530. For example, network metrics (e.g., packet loss, latency, travel time, etc.) may be compared to thresholds to determine whether or not the network behavior is at an acceptable level. When the network behavior is not acceptable as determined at operation 530, new probes are launched to determine new benchmarks for the network scenario at operation 580. For example, the path computation application may be adjusted (e.g., adjustment of resources for the path computation application, etc.) to alter network performance, and the new benchmarks are obtained for these adjustments. The process may be repeated from operation 530 in an iterative fashion until the network behavior becomes acceptable.

When the network behavior is acceptable as determined at operation 530, results for the path computation application based on the network scenario are analyzed at operation 540. The results from simulation of the hypothetical (e.g., "what-if", etc.) scenarios (e.g., impact to the path computation application, etc.) may provide possible variations from a current state that may be sent as feedback to network 110 and/or path computation element (PCE) server 120 in substantially the same manner described above.

By way of example, a resource decision may be rendered based on simulation results at operation 550 (e.g., more or less resources may need to be allocated to the path computation element (PCE) function, etc.) in substantially the same manner described above. Resource allocations may be performed for the path computation application (e.g., resource allocations for containers, virtual machine (VM), central processing unit (CPU), memory, etc. for the centralized and/or distributed path computation element (PCE) applications). The resource allocations may scale resources up or down, and may also scale resources in or out (e.g., adding or removing resource instances, etc.) based on simulation results (e.g., decrease or increase in path computation application performance, etc.).

Priorities for selection of a path computation element (PCE) server 120 may be performed at operation 560 based on the simulation results (e.g., priorities adjust selection to avoid selecting a busy PCE server, etc.) in substantially the same manner described above. The application visibility and hypothetical (e.g., "what-if", etc.) scenarios enable determination of different head-ends to distribute a request for path computation, and may leverage closed-loop performance information (instead of using static preferences).

New admission control rules may be set (or existing rules modified) for path computation element (PCE) servers 120 and/or network nodes 112 at operation 570 in substantially the same manner described above. In this case, PCE servers 120 and/or network nodes 112 may prevent application-level degradation by using admission control, including an ability to reject path computation requests that may compromise performance.

In addition, network design rules may be dynamically adjusted based on simulation results at operation 575 in substantially the same manner described above. The network design rules may indicate network configurations (e.g., sessions per path computation element (PCE) server and/or node, link state packets (LSP) per link, etc.).

The process is repeated for each application scenario benchmarked for the path computation application to determine an impact to the network for adjusting the path computation. This information may be fed back to network 110 and/or path computation element (PCE) server 120 to adjust the path computation (e.g., adjust resources, adjust priorities for selecting a PCE server, adjust admission control rules, adjust network design rules, etc.).

Figure 6:
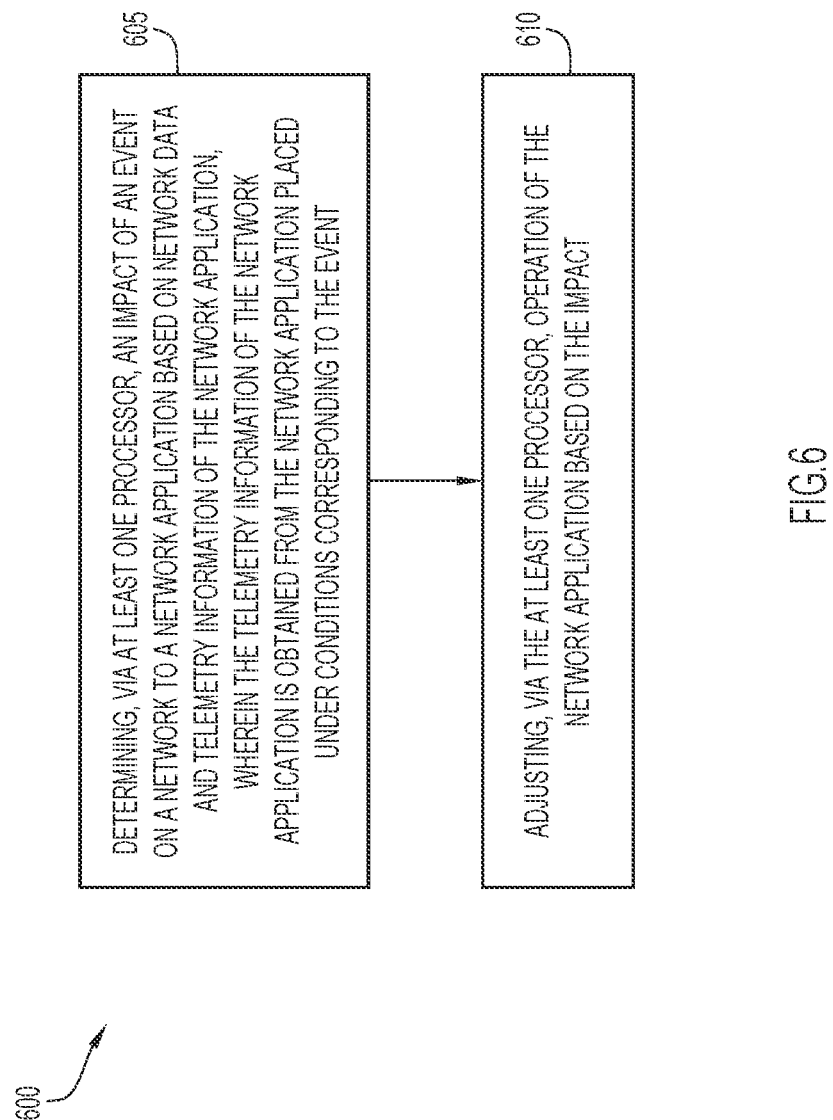
FIG. 6 illustrates a flowchart of a generalized method for controlling operation of a network application, according to an example embodiment.

FIG. 6 is a flowchart of an example method 600 for controlling operation of a network application. At operation

605, at least one processor determines an impact of an event on a network to a network application based on network data and telemetry information of the network application. The telemetry information of the network application is obtained from the network application placed under conditions corresponding to the event. At operation 610, the at least one processor adjusts operation of the network application based on the impact.

Figure 7:
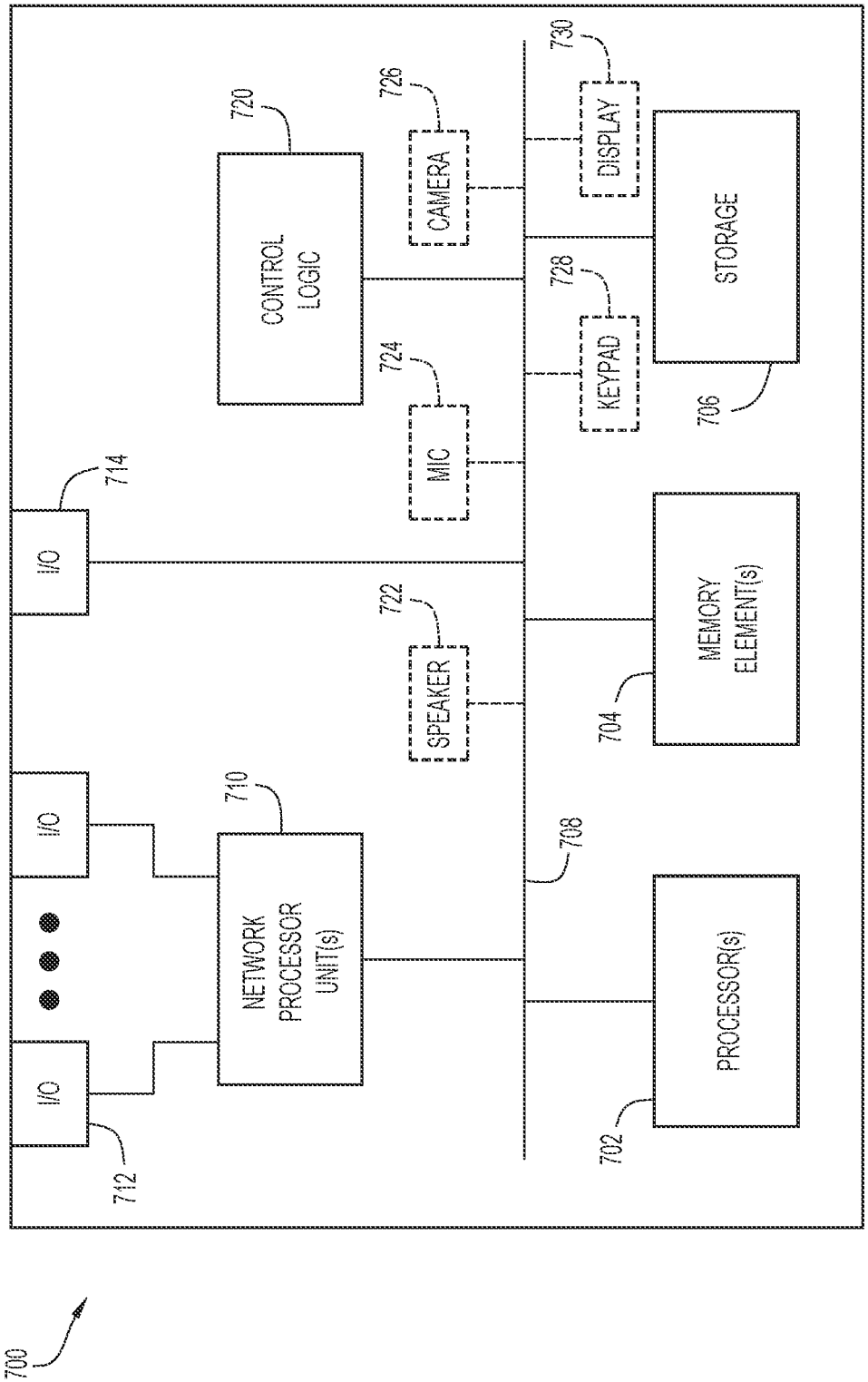
FIG. 7 illustrates a hardware block diagram of a computing device configured to perform functions associated with control of a network application as discussed herein, according to an example embodiment.

Referring to FIG. 7, FIG. 7 illustrates a hardware block diagram of a computing device 700 that may perform functions associated with operations discussed herein in connection with the techniques depicted in FIGS. 1-6. In various embodiments, a computing device or apparatus, such as computing device 700 or any combination of computing devices 700, may be configured as any device entity/entities (e.g., computer devices, server systems, endpoint devices, network nodes, probes, etc.) as discussed for the techniques depicted in connection with FIGS. 1-6 in order to perform operations of the various techniques discussed herein.

In at least one embodiment, computing device 700 may be any apparatus that may include one or more processor(s) 702, one or more memory element(s) 704, storage 706, a bus 708, one or more network processor unit(s) 710 interconnected with one or more network input/output (I/O) interface(s) 712, one or more I/O interface(s) 714, and control logic 720. In various embodiments, instructions associated with logic for computing device 700 can overlap in any manner and are not limited to the specific allocation of instructions and/or operations described herein.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720) can, in various embodiments, be stored for computing device 700 using any combination of memory element(s) 704 and/or storage 706. Note that in some embodiments, storage 706 can be consolidated with memory elements 704 (or vice versa), or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 710 may enable communication between computing device 700 and other systems, entities, etc., via network I/O interface(s) 712 to facilitate operations discussed for various embodiments described herein. In various embodiments, network processor unit(s) 710 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 712 can be configured as one or more Ethernet port(s), Fibre Channel ports, any other I/O port(s), and/or antenna(s)/antenna array(s) now known or hereafter developed. Thus, the network processor unit(s) 710 and/or network I/O interfaces 712 may include suitable interfaces for receiving, transmitting, and/or otherwise communicating data and/or information in a network environment.

I/O interface(s) 714 allow for input and output of data and/or information with other entities that may be connected to computing device 700. For example, I/O interface(s) 714 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

With respect to certain entities (e.g., computer device, endpoint device, user device, etc.), computing device 700 may further include, or be coupled to, an audio speaker 722 to convey sound, microphone or other sound sensing device 724, camera or image capture device 726, a keypad or keyboard 728 to enter information (e.g., alphanumeric information, etc.), and/or a touch screen or other display 730. These items may be coupled to bus 708 or I/O interface(s) 714 to transfer data with other elements of computing device 700.

In various embodiments, control logic 720 can include instructions that, when executed, cause processor(s) 702 to perform operations, which can include, but not be limited to, providing overall control operations of computing device 700; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs and software described herein may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other stores or repositories, queue, etc.). The data transmitted between device entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., graphical user interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, datacenters, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software. These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flowcharts and diagrams illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client, server, and other processing devices or systems, and/or any other intermediary processing devices. The software and/or algorithms described above and illustrated in the flowcharts and diagrams may be modified in any manner that accomplishes the functions described herein. In addition, the functions in the flowcharts, diagrams, or description may be performed in any order that accomplishes a desired operation.

The networks of present embodiments may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

In various embodiments, any device entity or apparatus as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more device entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory elements 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, any device entity or apparatus for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four device entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more device entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items.

For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In one form, a method is provided. The method comprises: determining, via at least one processor, an impact of an event on a network to a network application based on network data and telemetry information of the network application, wherein the telemetry information of the network application is obtained from the network application placed under conditions corresponding to the event; and adjusting, via the at least one processor, operation of the network application based on the impact.

In one example, the telemetry information includes metrics and traces of the network application.

In one example, the network application includes a path computation application.

In one example, determining the impact comprises: obtaining, via one or more probes, benchmark data from the network application placed under conditions of different network events; and analyzing the benchmark data to predict the impact to the network application.

In one example, the different network events include failure of one or more from a group of a network link and a network node.

In one example, adjusting operation of the network application comprises one or more from a group of: adjusting resources; determining priorities for selecting a server to use that includes the network application; adjusting rules indicating requests to be rejected; and adjusting network design rules.

In one example, determining the impact comprises: obtaining, via one or more probes, the network data from the network placed under conditions of different application events and the event; analyzing the network data to predict an impact to the network; adjusting operation of the network application based on the impact to the network to modify operation of the network to an acceptable level; and determining the impact to the network application based on the operation of the network.

In another form, an apparatus is provided. The apparatus comprises: one or more processors configured to: determine an impact of an event on a network to a network application based on network data and telemetry information of the network application, wherein the telemetry information of the network application is obtained from the network application placed under conditions corresponding to the event; and adjust operation of the network application based on the impact.

In another form, one or more non-transitory computer readable storage media are provided. The non-transitory computer readable storage media are encoded with processing instructions that, when executed by one or more processors, cause the one or more processors to: determine an impact of an event on a network to a network application based on network data and telemetry information of the network application, wherein the telemetry information of the network application is obtained from the network application placed under conditions corresponding to the event; and adjust operation of the network application based on the impact.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    simulating, via at least one processor, a plurality of hypothetical scenarios across a network and a network application;
    determining, via the at least one processor, an impact of an event on the network to performance of the network application based on network data and telemetry information of the network application, wherein the telemetry information of the network application is obtained from the network application during simulation of a hypothetical scenario corresponding to the event;
    determining, via the at least one processor, an impact of a change in performance of the network application on the network based on network metrics, wherein the network metrics are obtained during simulation of a hypothetical scenario adjusting quantities of requests or resources for the network application to alter performance of the network application; and
    adjusting, via the at least one processor, operation of the network application based on impacts to the network application and the network determined from the plurality of hypothetical scenarios.

2. The method of claim 1, wherein the telemetry information includes metrics and traces of the network application.

3. The method of claim 1, wherein the network application includes a path computation application.

4. The method of claim 1, wherein simulating the plurality of hypothetical scenarios comprises:
    obtaining, via one or more probes, benchmark data from the network application placed under conditions of different network events; and wherein determining the impact of the event on the network comprises:
analyzing the benchmark data to predict the impact to performance of the network application.

5. The method of claim 4, wherein the different network events include failure of one or more from a group of a network link and a network node.

6. The method of claim 1, wherein adjusting operation of the network application comprises one or more from a group of:
adjusting resources;
determining priorities for selecting a server to use that includes the network application;
adjusting rules indicating requests to be rejected; and
adjusting network design rules.

7. The method of claim 1, wherein simulating the plurality of hypothetical scenarios comprises:
obtaining, via one or more probes, the network data from the network placed under conditions of different application events and the event; and
wherein determining the impact of a change in performance of the network application on the network comprises:
analyzing the network data to predict an impact to the network;
adjusting operation of the network application based on the impact to the network to modify operation of the network to an acceptable level; and
determining the impact to the network application based on the operation of the network.

8. An apparatus comprising:
one or more processors configured to perform operations including:
simulating a plurality of hypothetical scenarios across a network and a network application;
determining an impact of an event on the network to performance of the network application based on network data and telemetry information of the network application, wherein the telemetry information of the network application is obtained from the network application during simulation of a hypothetical scenario corresponding to the event;
determining an impact of a change in performance of the network application on the network based on network metrics, wherein the network metrics are obtained during simulation of a hypothetical scenario adjusting quantities of requests or resources for the network application to alter performance of the network application; and
adjusting operation of the network application based on impacts to the network application and the network determined from the plurality of hypothetical scenarios.

9. The apparatus of claim 8, wherein the telemetry information includes metrics and traces of the network application.

10. The apparatus of claim 8, wherein simulating the plurality of hypothetical scenarios comprises:
obtaining, via one or more probes, benchmark data from the network application placed under conditions of different network events; and
wherein determining the impact of the event on the network comprises:
analyzing the benchmark data to predict the impact to performance of the network application.

11. The apparatus of claim 10, wherein the different network events include failure of one or more from a group of a network link and a network node.

12. The apparatus of claim 8, wherein adjusting operation of the network application comprises one or more from a group of:
adjusting resources;
determining priorities for selecting a server to use that includes the network application;
adjusting rules indicating requests to be rejected; and
adjusting network design rules.

13. The apparatus of claim 8, wherein simulating the plurality of hypothetical scenarios comprises:
obtaining, via one or more probes, the network data from the network placed under conditions of different application events and the event; and
wherein determining the impact of a change in performance of the network application on the network comprises:
analyzing the network data to predict an impact to the network;
adjusting operation of the network application based on the impact to the network to modify operation of the network to an acceptable level; and
determining the impact to the network application based on the operation of the network.

14. One or more non-transitory computer readable storage media encoded with processing instructions that, when executed by one or more processors, cause the one or more processors to perform operations including:
simulating a plurality of hypothetical scenarios across a network and a network application;
determining an impact of an event on the network to performance of the network application based on network data and telemetry information of the network application, wherein the telemetry information of the network application is obtained from the network application during simulation of a hypothetical scenario corresponding to the event;
determining an impact of a change in performance of the network application on the network based on network metrics, wherein the network metrics are obtained during simulation of a hypothetical scenario adjusting quantities of requests or resources for the network application to alter performance of the network application; and
adjusting operation of the network application based on impacts to the network application and the network determined from the plurality of hypothetical scenarios.

15. The one or more non-transitory computer readable storage media of claim 14, wherein the telemetry information includes metrics and traces of the network application.

16. The one or more non-transitory computer readable storage media of claim 14, wherein the network application includes a path computation application.

17. The one or more non-transitory computer readable storage media of claim 14, wherein simulating the plurality of hypothetical scenarios comprises:
obtaining, via one or more probes, benchmark data from the network application placed under conditions of different network events; and
wherein determining the impact of the event on the network comprises:
analyzing the benchmark data to predict the impact to performance of the network application.

18. The one or more non-transitory computer readable storage media of claim 17, wherein the different network events include failure of one or more from a group of a network link and a network node.

19. The one or more non-transitory computer readable storage media of claim 14, wherein adjusting operation of the network application comprises one or more from a group of:
   adjusting resources;
   determining priorities for selecting a server to use that includes the network application;
   adjusting rules indicating requests to be rejected; and
   adjusting network design rules.

20. The one or more non-transitory computer readable storage media of claim 14, wherein simulating the plurality of hypothetical scenarios comprises:
   obtaining, via one or more probes, the network data from the network placed under conditions of different application events and the event; and
   wherein determining the impact of a change in performance of the network application on the network comprises:
      analyzing the network data to predict an impact to the network;
      adjusting operation of the network application based on the impact to the network to modify operation of the network to an acceptable level; and
      determining the impact to the network application based on the operation of the network.

* * * * *